United States Patent
Hasegawa et al.

(10) Patent No.: US 11,207,920 B2
(45) Date of Patent: Dec. 28, 2021

(54) PNEUMATIC TIRE

(71) Applicant: BRIDGESTONE CORPORATION, Tokyo (JP)

(72) Inventors: Keiichi Hasegawa, Tokyo (JP); Masahiro Katayama, Tokorozawa (JP)

(73) Assignee: BRIDGESTONE CORPORATION, Tokyo (JP)

( * ) Notice: Subject to any disclaimer, the term of this patent is extended or adjusted under 35 U.S.C. 154(b) by 75 days.

(21) Appl. No.: 16/622,104

(22) PCT Filed: Jun. 7, 2018

(86) PCT No.: PCT/JP2018/021841
§ 371 (c)(1),
(2) Date: Dec. 12, 2019

(87) PCT Pub. No.: WO2018/235614
PCT Pub. Date: Dec. 27, 2018

(65) Prior Publication Data
US 2020/0114690 A1    Apr. 16, 2020

(30) Foreign Application Priority Data
Jun. 19, 2017  (JP) .............................. JP2017-119893

(51) Int. Cl.
*B60C 9/18* (2006.01)
*B60C 9/20* (2006.01)

(52) U.S. Cl.
CPC .............. *B60C 9/20* (2013.01); *B60C 9/1835* (2013.01); *B60C 2009/2061* (2013.01)

(58) Field of Classification Search
CPC ........ B60C 9/185; B60C 9/1835; B60C 5/007

USPC ......................................................... 152/532
See application file for complete search history.

(56) References Cited

U.S. PATENT DOCUMENTS

| | | |
|---|---|---|
| 3,802,478 A | 4/1974 | Boustany et al. |
| 5,201,971 A | 4/1993 | Gifford |
| 5,503,205 A * | 4/1996 | Aoki .................. B60C 3/04 152/209.14 |
| 6,959,746 B2 | 11/2005 | Shimizu |
| 9,393,838 B2 | 7/2016 | Ogasawara et al. |
| 9,987,882 B2 | 6/2018 | Huyghe, Jr. |
| 9,994,075 B2 | 6/2018 | Kon et al. |

(Continued)

FOREIGN PATENT DOCUMENTS

| | | |
|---|---|---|
| CN | 1458882 A | 11/2003 |
| CN | 103476893 A | 12/2013 |

(Continued)

OTHER PUBLICATIONS

Aug. 28, 2018, International Search Report issued in the International Patent Application No. PCT/JP2018/021841.

(Continued)

*Primary Examiner* — Robert C Dye
*Assistant Examiner* — Farah Taufiq
(74) *Attorney, Agent, or Firm* — Kenja IP Law PC

(57) ABSTRACT

The pneumatic tire according to the disclosure includes a resin-coated belt comprising a wire coated with a coating resin. A base ring is formed at a tire radial inside of the resin-coated belt, while being in contact with a tire widthwise outer end of the resin-coated belt. A concavo-convex portion is formed on at least one of surfaces of the base ring.

5 Claims, 4 Drawing Sheets

(56) References Cited

U.S. PATENT DOCUMENTS

| | | | |
|---|---|---|---|
| 2004/0026000 A1 | 2/2004 | Akiyoshi | |
| 2016/0068021 A1* | 3/2016 | Kon | B60C 5/007 152/526 |
| 2016/0075180 A1 | 3/2016 | Kon et al. | |
| 2016/0221288 A1* | 8/2016 | Zarak | B29D 30/542 |
| 2016/0368323 A1 | 12/2016 | Kouno et al. | |
| 2017/0036495 A1 | 2/2017 | Ogawa | |

FOREIGN PATENT DOCUMENTS

| | | |
|---|---|---|
| CN | 104203600 A | 12/2014 |
| CN | 105121179 A | 12/2015 |
| CN | 105121180 A | 12/2015 |
| CN | 105377579 A | 3/2016 |
| CN | 106232395 A | 12/2016 |
| EP | 1034083 A1 | 9/2000 |
| EP | 2698408 A1 | 2/2014 |
| JP | H1035220 A | 2/1998 |
| JP | 2006044487 A | 2/2006 |
| JP | 2006076407 A | 3/2006 |
| JP | 2009248771 A | 10/2009 |
| JP | 2011063095 A | 3/2011 |
| JP | 2016078736 A | 5/2016 |
| KR | 1020070029917 A | 3/2007 |
| WO | 9922951 A1 | 5/1999 |
| WO | 02074560 A1 | 9/2002 |
| WO | 2014171521 A1 | 10/2014 |

OTHER PUBLICATIONS

Jan. 11, 2021, search result of the Extended European Search Report issued by the European Patent Office in the corresponding European Patent Application No. 18820294.9.

Dec. 24, 2019, International Preliminary Report on Patentability issued in the International Patent Application No. PCT/JP2018/021841.

Apr. 6, 2021, search result of Office Action issued by the China National Intellectual Property Administration in the corresponding Chinese Patent Application No. 201880040977.2.

\* cited by examiner

PNEUMATIC TIRE

TECHNICAL FIELD

The present disclosure relates to a pneumatic tire.

BACKGROUND

Heretofore, in a pneumatic tire, a belt has been usually disposed on an outer side of a carcass in a tire radial direction to exert a hoop effect of fastening the carcass and to heighten a rigidity of a tread (e.g., Patent Literature 1).

In recent years, demand for weight reduction of a tire has risen, and it has therefore been suggested that a wire coated with a coating resin is used as a belt. By use of such a resin-coated belt, the above function of the belt can be exerted while achieving the weight reduction, because the resin has a high rigidity for its weight.

CITATION LIST

Patent Literature

PTL 1: Japanese Patent Laid-Open No. 1998-035220

SUMMARY

Technical Problem

In a case where a resin-coated belt is used in a pneumatic tire, however, a difference in level of rigidity is made with a tire widthwise end of the resin-coated belt as a boundary due to a high rigidity of the resin-coated belt, to such an extent that a sharp and large change in a tire circumferential rigidity occurs in a tire width direction. Therefore, the strain at the end of the resin-coated belt is likely to be intensified, causing the failure at the end of the resin-coated belt. Improvement of durability of tire has been demanded by suppressing such failure. Alleviating the difference in level of rigidity by utilizing the specific member has been considered. This case requires suppression of the failure owing to arrangement of the specific member to improve durability of tire.

Therefore, it is an object of the present disclosure to provide a pneumatic tire having improved durability of the tire.

Solution to Problem

The present disclosure is configured as follows.

A pneumatic tire according to the disclosure includes a resin-coated belt comprising a wire coated with a coating resin. A base ring is formed at a tire radial inside of the resin-coated belt, while being in contact with a tire widthwise outer end of the resin-coated belt. A concavo-convex portion is formed on at least one of surfaces of the base ring.

In the specification, the "groove width" of the groove refers to a maximum width of the groove having its width variable in the groove extending direction.

In the specification, the "maximum size" refers to a maximum value of a distance between two points of an outer contour line of either a concave portion or a convex portion of the single concavo-convex portion in a planar view. In the case of a plurality of concavo-convex portions, the "maximum size" refers to the largest "maximum size" among those of the concavo-convex portions.

Advantageous Effect

According to the present disclosure, there can be provided a pneumatic tire having improved durability of the tire.

DETAILED DESCRIPTION

Hereinafter, embodiments of the present disclosure will be illustrated and described in detail with reference to the drawings.

Figure 1:
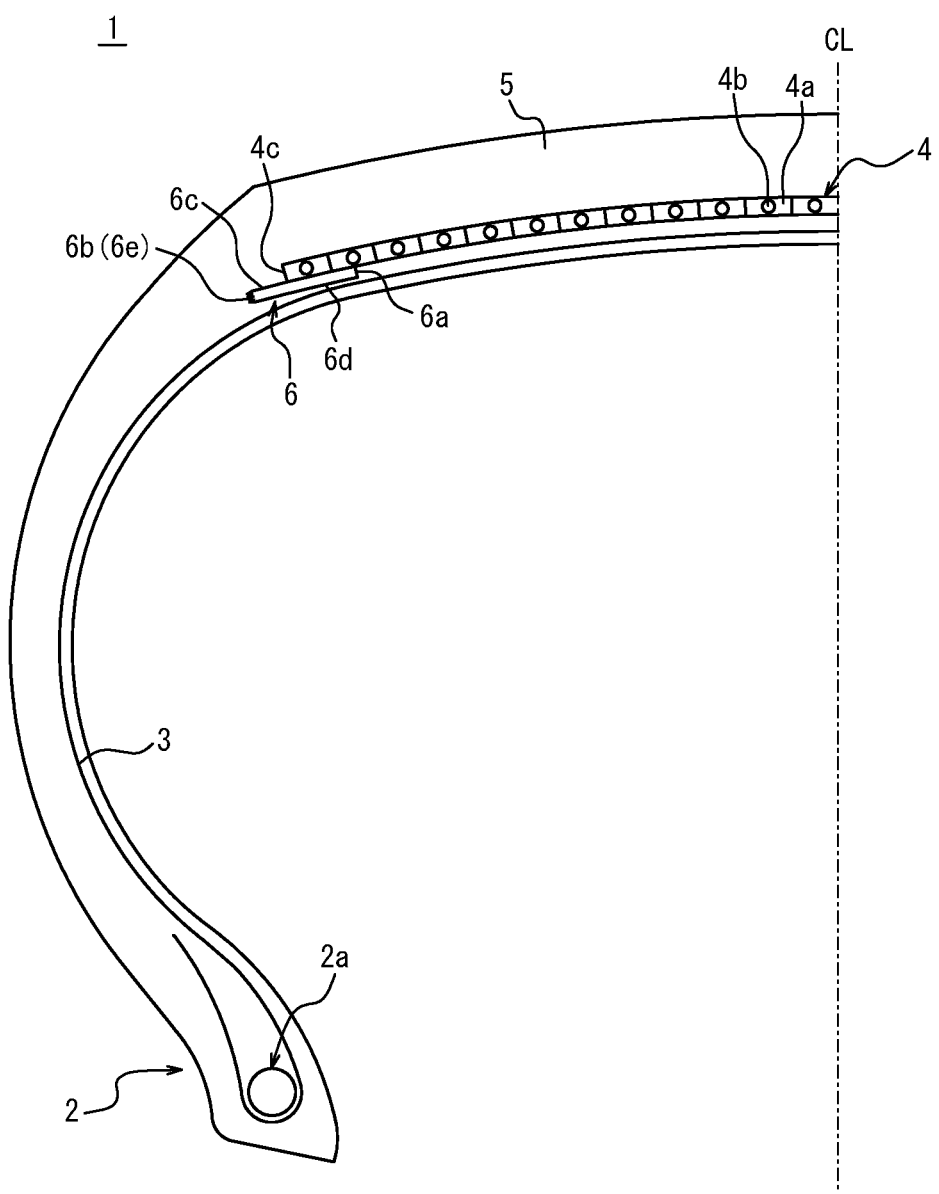
FIG. 1 is a schematic partially cross-sectional view in a tire width direction, illustrating a tire widthwise half portion of a pneumatic tire according to an embodiment of the present disclosure.

FIG. 1 is a schematic partially cross-sectional view in a tire width direction, illustrating a tire widthwise half portion of a pneumatic tire according to an embodiment of the present disclosure. FIG. 1 only illustrates one tire widthwise half portion with a tire equatorial plane CL as a boundary, and omits depiction of the other half portion. The other half portion also has a similar configuration. A pneumatic tire 1 (hereinafter also referred to simply as the tire) of the present embodiment comprises a resin-coated belt 4 comprising a wire 4b coated with a coating resin 4a, and a tread 5 in order on an outer side of a crown portion of a carcass 3 that toroidally straddles a bead core 2a embedded in a pair of bead portions 2 in a tire radial direction.

In the present disclosure, there are not any special restrictions on a belt structure, and a tire structure other than a configuration of an after-mentioned base ring, and the structure can be configured using a usual rubber according to the convention.

For example, in the present embodiment, the structure includes the bead core 2a formed by bundling steel wires, but there are not any special restrictions on a material and a shape of the bead core. Alternatively, the structure does not have to include the bead core 2a. Furthermore, in the present embodiment, the carcass 3 is formed with a carcass ply made of organic fibers, and there are not any special restrictions on a material or number of carcass plies.

In the present embodiment, the resin-coated belt 4 is a spiral belt formed by spirally winding, about a tire axis, a resin-coated wire formed by coating the wire 4b with the coating resin 4a. Accordingly, the resin-coated belt 4 may be easily formed. In the present disclosure, it is preferable that the resin-coated belt 4 comprises one layer. A resin containing a wire has a high rigidity, and hence, a tread rigidity can be sufficiently heightened with the one layer, which is also preferable from a viewpoint of weight reduction. The resin-coated belt 4 can have a tire widthwise width that is, for example, from 90 to 120% of a tire ground contact width.

In the wire 4b, an arbitrary known material can be used, and, for example, a steel cord can be used. The steel cord can be formed of, for example, a steel monofilament or a stranded wire. Furthermore, in the wire 4b, the organic fibers, carbon fibers or the like may be used.

Additionally, in the coating resin 4a, for example, a thermoplastic elastomer or a thermoplastic resin can be used, and a resin that crosslinks by heat or an electron beam or a resin that cures by thermal dislocation can be used. Examples of the thermoplastic elastomer include polyolefin thermoplastic elastomer (TPO), polystyrene thermoplastic elastomer (TPS), polyamide thermoplastic elastomer (TPA), polyurethane thermoplastic elastomer (TPU), polyester thermoplastic elastomer (TPC), and dynamic crosslinking thermoplastic elastomer (TPV). Furthermore, examples of the thermoplastic resin include polyurethane resin, polyolefin resin, vinyl chloride resin, and polyamide resin. Furthermore, as the thermoplastic resin, a resin can be used in which, for example, a deflection temperature under load (under a load of 0.45 MPa) prescribed in ISO75-2 or ASTM D648 is 78° C. or more, a tensile yield strength prescribed in JIS K7113 is 10 MPa or more, a tensile rupture elongation (JIS K7113) similarly prescribed in JIS K7113 is 50% or more, and Vicat softening temperature (A-method) prescribed in JIS K7206 is 130° C. or more. It is preferable that the coating resin 4a that coats the wire 4b has a tensile elastic modulus (prescribed in JIS K7113: 1995) of 50 MPa or more. Furthermore, it is preferable that the tensile elastic modulus of the coating resin 4a that coats the wire 4b is 1000 MPa or less. Note that the coating resin 4a mentioned herein does not contain a rubber (an organic polymer material that exhibits a rubber elasticity at normal temperature).

The spiral belt can be formed, for example, by coating an outer peripheral side of the wire 4b with the molten coating resin 4a, cooling and solidifying the resin to form the resin-coated wire, and welding and bonding, to each other, the resin-coated wires adjacent in an axial direction of an annular material formed by winding the resin-coated wire while melting the coating resin 4a by hot plate welding or the like. Alternatively, the spiral belt may be formed by bonding and joining, to each other, the resin-coated wires adjacent in the axial direction of the formed annular material with an adhesive or the like.

As illustrated in FIG. 1, in the tire 1 of the present embodiment, a base ring 6 that comes in contact with a tire widthwise outer end 4c of the resin-coated belt 4 (at least a part of the ring is located at the same position as a position of the tire widthwise outer end 4c of the resin-coated belt 4 in the tire width direction) is provided on a tire radial inside of the resin-coated belt 4. The base ring 6 is an annular member (in this example, the member extends continuously in a tire circumferential direction) made of a resin in this example. As the resin, the same resin as the coating resin 4a of the resin-coated belt 4 may be used, or a different resin may be used. Also in a case where the resin of the base ring 6 is different from the coating resin 4a of the resin-coated belt 4, the above illustrated thermoplastic elastomer or thermoplastic resin can be used as a material of the coating resin 4a.

As illustrated in FIG. 1, a tire widthwise inner end 6a of the base ring 6 is located on an inner side of the tire widthwise outer end 4c of the resin-coated belt 4 in the tire width direction, and a tire widthwise outer end 6b of the base ring 6 is located on an outer side of the tire widthwise outer end 4c of the resin-coated belt 4 in the tire width direction. In the present disclosure, it is preferable that a width of the base ring 6 in the tire width direction is 7% or more of a width of the resin-coated belt 4 in the tire width direction. When the percentage is 7% or more, the resin-coated belt 4 can be easily disposed during manufacturing (especially in a case where the spiral belt is wound). Furthermore, it is preferable that a central position of the base ring 6 in the tire width direction is a position of the tire widthwise outer end 4c of the resin-coated belt 4 or a tire widthwise position near the outer end. During the manufacturing, the resin-coated belt 4 can be easily disposed (especially in the case where the spiral belt is wound). Furthermore, the after-mentioned base ring 6 can securely exert an effect of decreasing a difference in level of rigidity between the resin-coated belt 4 and the rubber. A thickness of the base ring 6 can be from 0.5 to 2 mm, and a tire widthwise distance from the tire widthwise outer end 4c of the resin-coated belt 4 to each of the tire widthwise inner end and outer end of the base ring 6 can be 0 mm or more. It is assumed that values of the "width in the tire width direction" of the base ring 6 and the resin-coated belt 4, and the other size in the specification are measured in a state where the tire is installed to the applicable rim, and charged with the prescribed internal pressure and no load (provided that "the tire ground contact width" is a tire widthwise distance between ground contact ends in a state where the tire is installed to the applicable rim, and charged with the prescribed internal pressure and no load, the ground contact end being a tire widthwise outermost position of a contact patch in a state where the tire is installed to an applicable rim and charged with the prescribed internal pressure and a maximum load). In the present description, "the applicable rim" indicates an approved rim (a measuring rim in Standards Manual of ETRTO, and a design rim in Year Book of TRA) in an applicable size described or to be described in future in an industrial standard valid in a district where the tire is produced and used, for example, JATMA Year Book of JATMA (the Japan Automobile Tyre Manufacturers Association) in Japan, Standards Manual of ETRTO (the European Tyre and Rim Technical Organisation) in Europe, or Year Book of TRA (the Tire and Rim Association, Inc.) in U.S. (That is, the above rim also includes a size that can be included in the above industrial standard in future, in addition to the existing size. Examples of "the size to be described in future" can include sizes described as "future developments" in 2013 edition of Standards Manual of ETRTO.) However, it is considered that a rim having a size that is not described in the above industrial standard is a rim having a width corresponding to a bead width of the tire. Additionally, "the prescribed internal pressure" indicates an air pressure (a maximum air pressure) corresponding to a tire maximum load capability of a standard such as JATMA described above in the tire of the applicable size. Note that in case of a size that is not described in the above industrial standard, "the prescribed internal pressure" is an air pressure (the maximum air pressure) corresponding to the maximum load capability prescribed for each vehicle to which the tire is installed. "The maximum load" means a load corresponding to the tire maximum load capability of the standard such as JATMA described above in the tire of the applicable size, or the maximum load capability prescribed for each vehicle to which the tire is installed in a case where the load has a size that is not described in the above industrial standard.

Figure 2A:
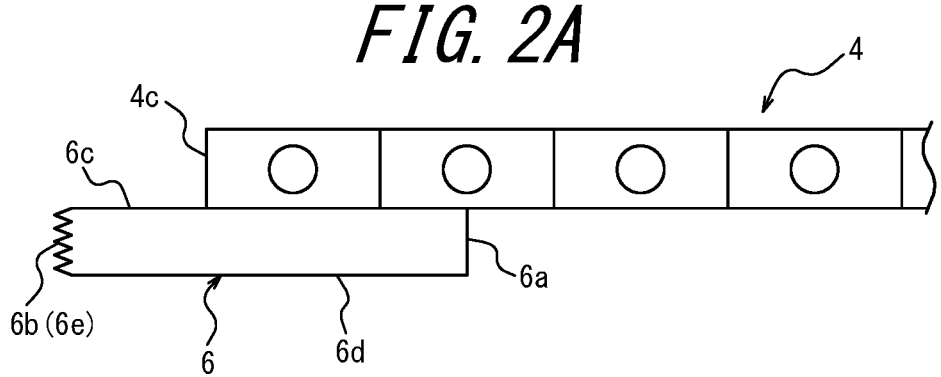
FIG. 2A is a partial sectional view of a part of a resin-coated belt and a base ring of the pneumatic tire as illustrated in FIG. 1.

FIG. 2A is a partial sectional view of a part of the resin-coated belt, and the base ring of the pneumatic tire as illustrated in FIG. 1. As FIG. 2A illustrates, in the embodiment, the base ring 6 has a substantially rectangular cross section.

As FIG. 2A illustrates, in the embodiment, concavo-convex portions 6e are formed on an arbitrary surface of the base ring 6. Referring to an example of FIG. 2A, the concavo-convex portions 6e are formed on a surface constituting the tire widthwise outer end 6b of the base ring 6.

Figure 3A:
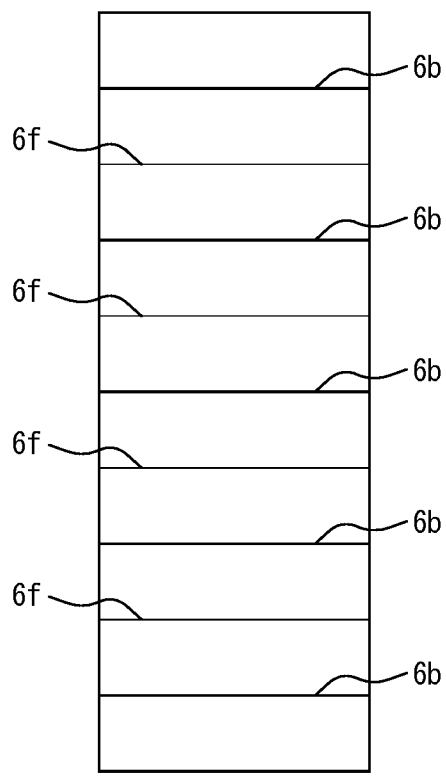
FIG. 3A is a schematic view of the base ring of the pneumatic tire as illustrated in FIG. 1 when seen from a direction confronting a surface on which the concavo-convex portions are formed.

FIG. 3A is a schematic view of the base ring of the pneumatic tire as illustrated in FIG. 1. As FIG. 3A illustrates, in the embodiment, the concavo-convex portions 6e are formed by a groove 6f extending in the tire circumferential direction.

Hereinafter, description will be made as to operations and effects of the present embodiment.

The pneumatic tire according to the embodiment includes the base ring 6 at the tire radial inside of the resin-coated belt 4, while having the base ring 6 in contact with the tire widthwise outer end 4c of the resin-coated belt 4. Compared with the case of sharp difference in level of rigidity between the resin-coated belt 4 and the rubber (base ring 6 is not provided) in the tire width direction, the pneumatic tire of the embodiment is capable of alleviating the difference in level of rigidity that occurs at the tire widthwise outer end 4c of the resin-coated belt 4 as the boundary.

In this embodiment, the concavo-convex portions 6e in the above-described range of size are formed on the surface constituting the tire widthwise outer end 6b of the base ring 6. The adhesive area between the surface and the rubber is increased to enhance adhesiveness between the base ring 6 and the rubber. This makes it possible to suppress exfoliation of the base ring 6 from the rubber.

In this embodiment, the concavo-convex portions 6e are formed by the groove 6f nonlinearly extending in the tire circumferential direction. Even if the crack occurs in the interface between the surface constituting the tire widthwise outer end 6b of the base ring 6 and the rubber, the crack propagation path is elongated to be longer than the case of the linearly formed groove. This makes it possible to suppress the crack propagation.

As described above, the pneumatic tire according to the embodiment is capable of improving durability of tire.

Figure 2B:
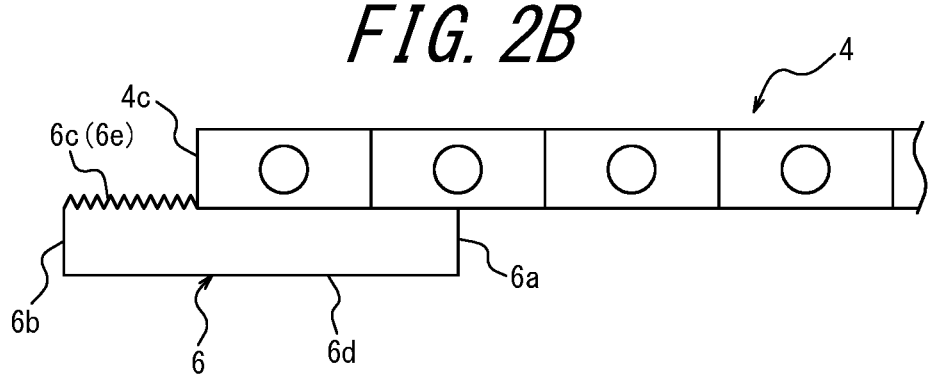
FIG. 2B is a partial sectional view of another arrangement of concavo-convex portions.
Figure 2C:
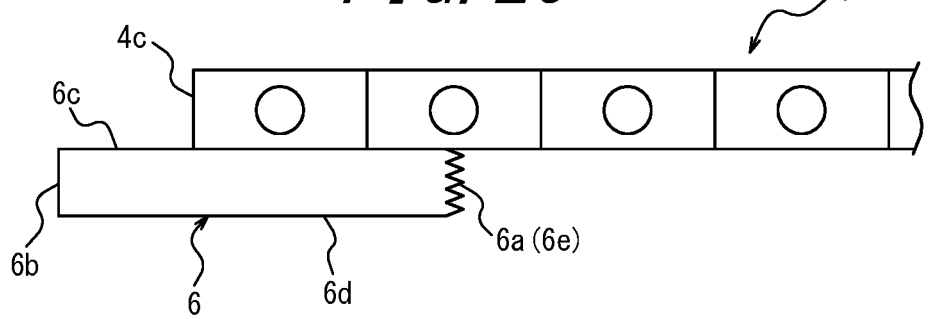
FIG. 2C is a partial sectional view of another arrangement of the concavo-convex portions.
Figure 2D:
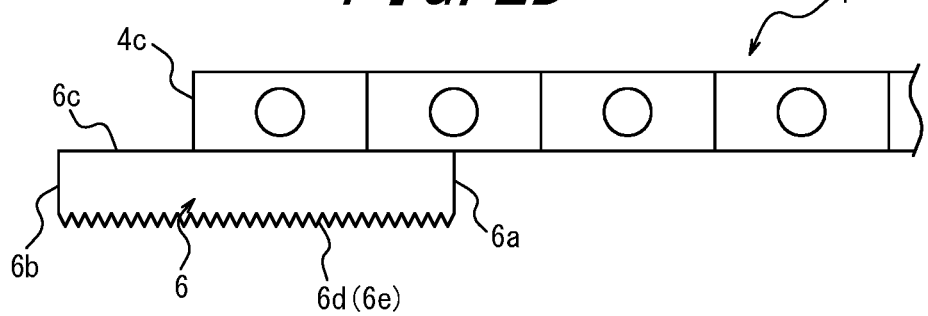
FIG. 2D is a partial sectional view of another arrangement of the concavo-convex portions.

FIGS. 2B to 2D are partial sectional views illustrating various arrangements of the concavo-convex portions 6e. Referring to the example of FIG. 2B, the concavo-convex portions 6e are formed on a surface constituting the tire radial outer end 6c of the base ring 6. Referring to the example of FIG. 2C, the concavo-convex portions 6e are formed on a surface constituting the tire widthwise inner end 6a of the base ring 6. Referring to the example of FIG. 2D, the concavo-convex portions 6e are formed on a surface constituting a tire radial inner end 6d of the base ring 6.

As described above, in the embodiment as illustrated in FIG. 2A, the concavo-convex portions 6e are formed on the surface constituting the tire widthwise outer end 6b. In the present disclosure, the concavo-convex portions 6e may be formed on at least any one of surfaces of the base ring 6 as illustrated in FIGS. 2B to 2D to increase the adhesive area between the surface on which the concavo-convex portions 6e are formed, and the rubber. This makes it possible to provide the similar effects to those described above.

Referring to the examples as illustrated in FIGS. 2A to 2D, the concavo-convex portions 6e are formed only on one surface of the base ring 6. In the present disclosure, it is preferable to form the concavo-convex portions 6e on two or more surfaces of the base ring 6 from the viewpoint of increasing the adhesive area between the base ring 6 and the rubber. It is further preferable to form the concavo-convex portions 6e on all surfaces of the base ring 6.

The concavo-convex portions 6e may be formed on either entire areas or partial areas of the respective surfaces of the base ring 6.

As described above, in the present disclosure, it is preferable to form the concavo-convex portions 6e by the groove 6f extending nonlinearly in the tire circumferential direction. Even if the crack occurs in the interface between the surface of the base ring 6 (on which the concavo-convex portions are formed) and the rubber, the crack propagation path is elongated to be longer than the case of the linearly formed groove. This makes it possible to suppress the crack propagation.

In this case, preferably, the groove 6f has its groove width equal to or larger than 0.8 mm, and equal to or smaller than 2 mm. By setting the groove width to 0.8 mm or larger, it is possible to secure sufficient increase in the contact area. Meanwhile, by setting the groove width to 2 mm or smaller, the contact area between the base ring 6 and the rubber is not reduced while preventing large increase in the non-adhesive part between the groove 6f and the rubber.

In this case, it is preferable to set the maximum amplitude of the nonlinear (for example, zigzag-shaped, curved, and the like) groove 6f in the tire width direction to 3 mm or smaller to prevent increase in the non-adhesive part between the groove 6f and the rubber. This makes it possible to keep the contact area between the base ring 6 and the rubber from being reduced.

In the present disclosure, preferably, the concavo-convex portions 6e are formed especially on the surface constituting the tire widthwise outer end 6b of the base ring 6. The crack is likely to occur in the interface between the base ring 6 and the rubber. If the crack occurs in the interface between the surface constituting the tire widthwise outer end 6b of the base ring 6 and the rubber, the crack propagation may be suppressed in the most effective manner.

Figure 3B:
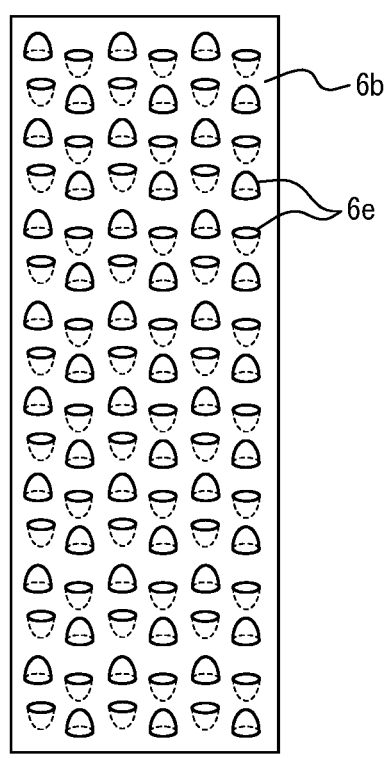
FIG. 3B is a schematic view of an example that many micro concavo-convex portions are formed.

FIG. 3B illustrates an example of many micro concavo-convex portions when seen from the direction confronting the surface on which those concavo-convex portions are formed. In the present disclosure, preferably, the concavo-convex portion 6e with the maximum size equal to or larger than 0.1 mm, and equal to or smaller than 0.5 mm is formed on at least any one of surfaces of the base ring 6 with the density of 4 to 100 concavo-convex portions/$mm^2$. This makes it possible to increase the adhesive area between the base ring 6 and the rubber in a more effective manner.

In this case, as FIGS. 2A to 2D illustrate, the concavo-convex portions 6e may be formed on at least any one of the surfaces of the base ring 6. However, it is preferable to form the concavo-convex portions 6e on two or more surfaces from the viewpoint of increasing the adhesive area between the base ring 6 and the rubber. It is more preferable to form the concavo-convex portions 6e on all the surfaces.

Preferably, the maximum depth of the concavo-convex portion 6e is in the range from 0.03 to 3.2 mm (preferably, from 0.4 to 3.2 mm).

Figure 4:
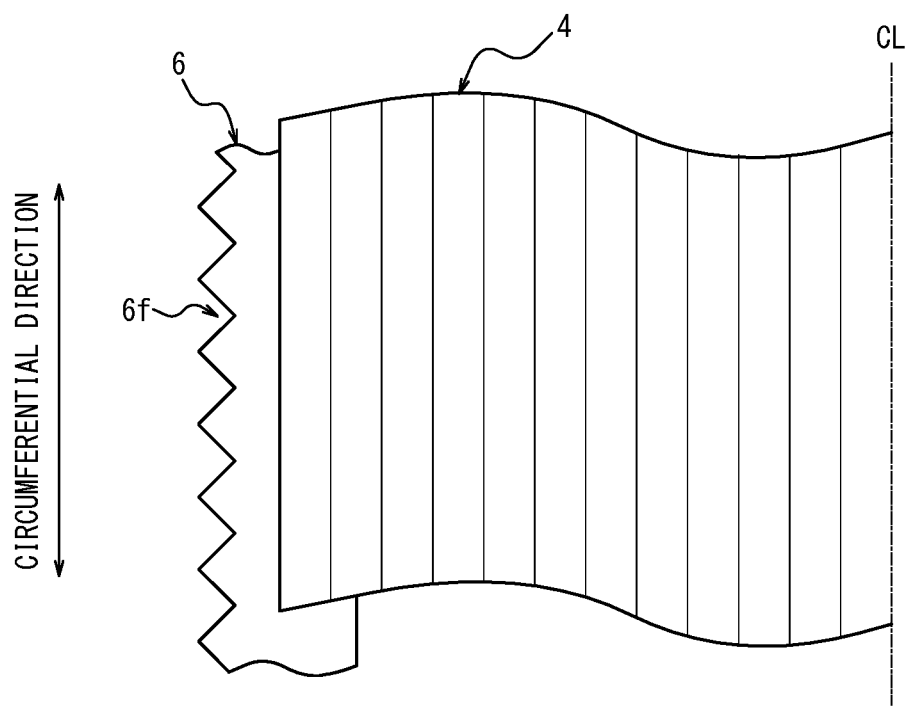
FIG. 4 is a schematic perspective view of the resin-coated belt and the base ring.

FIG. 4 is a schematic perspective view of the resin-coated belt 4 and the base ring 6. In this example, the groove 6f extending in zigzags in the tire circumferential direction is formed on the surface of the tire widthwise outer end 6b of the base ring 6. As described above, it is preferable to set the width of the groove 6f to 0.8 mm or larger, and to 2 mm or smaller. Likewise the above-described embodiment, in this case, even if the crack occurs in the interface between the surface of the base ring 6 (on which the concavo-convex portions are formed) and the rubber, the crack propagation path is elongated to be longer than the case of the linearly formed groove. This makes it possible to suppress the crack propagation.

Figure 5:
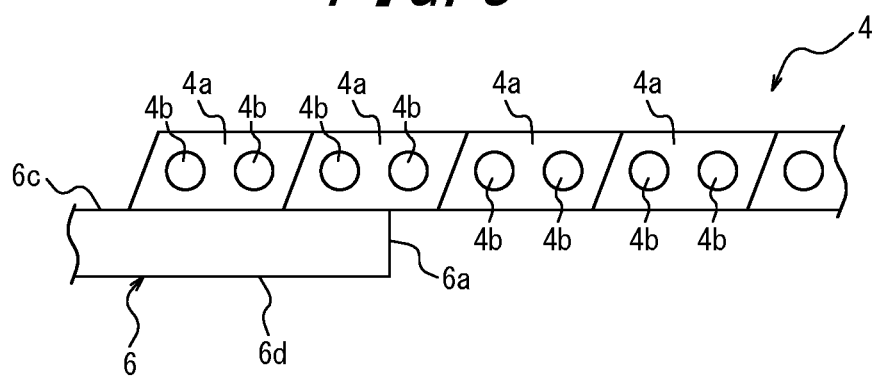
FIG. 5 is a partial sectional view of another example of a part of the resin-coated belt and the base ring.

FIG. 5 is a partial sectional view of another example of a part of the resin-coated belt and the base ring. In this example, the resin-coated wire has a parallelogramic cross section. The resin-coated belt 4 also has the parallelogramic cross section.

As above, the embodiment of the present disclosure has been described, but the present disclosure is not limited to the above embodiment. For example, FIG. 3A illustrates two grooves 6f extending in zigzags in the tire circumferential direction. The number of the grooves is not limited so long as it is one or more. The groove may be designed to extend curvedly rather than in zigzags. Formation of the concavo-convex portions on the surface of the base ring 6 as the bonded surface to the resin-coated belt 4 allows enhancement of the bonding strength between the base ring 6 and the resin-coated belt 4. The wire or the like extending in the tire circumferential direction, for example, may be provided in the base ring 6.

REFERENCE SIGNS LIST

1 pneumatic tire
2 bead portion
2a bead core
3 carcass
4 resin-coated belt
4a coating resin
4b wire
4c tire widthwise outer end of the resin-coated belt
5 tread
6 base ring
6a tire widthwise inner end of the base ring
6b tire widthwise outer end of the base ring
6c tire radial outer end of the base ring
6d tire radial inner end of the base ring
6e concavo-convex portion
6f groove (concavo-convex portion)
CL tire equatorial plane

The invention claimed is:

1. A pneumatic tire including a resin-coated belt comprising a wire coated with a coating resin, wherein:
a base ring is formed at a tire radial inside of the resin-coated belt, the base ring being in contact with a tire widthwise outer end of the resin-coated belt;
a concavo-convex portion is formed on at least one of surfaces of the base ring; and
the concavo-convex portion is formed by a groove non-linearly extending in a tire circumferential direction.

2. The pneumatic tire according to claim 1, wherein the groove has a groove width equal to or larger than 0.8 mm, and equal to or smaller than 2 mm.

3. The pneumatic tire according to claim 1, wherein the concavo-convex portion is formed on a surface of a tire widthwise outer end of the base ring.

4. The pneumatic tire according to claim 1, wherein the concavo-convex portion with a maximum size equal to or larger than 0.1 mm and equal to or smaller than 0.5 mm is formed on the surface with a density of 4 to 100 concavo-convex portions/mm$^2$, the maximum size being a maximum distance between two points of an outer contour line of either a concave or a convex of the concavo-convex portion in a planar view.

5. The pneumatic tire according to claim 2, wherein the concavo-convex portion is formed on a surface of a tire widthwise outer end of the base ring.

* * * * *